(12) United States Patent
Clarberg

(10) Patent No.: US 10,134,160 B2
(45) Date of Patent: Nov. 20, 2018

(54) ANTI-ALIASING FOR GRAPHICS HARDWARE

(71) Applicant: Intel Corporation, Santa Clara, CA (US)

(72) Inventor: Franz P. Clarberg, Lund (SE)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 14/037,635

(22) Filed: Sep. 26, 2013

(65) Prior Publication Data

US 2015/0084981 A1    Mar. 26, 2015

(51) Int. Cl.
    *G09G 5/00* (2006.01)
    *G06T 11/40* (2006.01)

(52) U.S. Cl.
    CPC .......... *G06T 11/40* (2013.01); *G06T 2200/12* (2013.01)

(58) Field of Classification Search
    CPC .................. G06T 11/40; G06T 2200/12
    See application file for complete search history.

(56) References Cited

U.S. PATENT DOCUMENTS

| | | | |
|---|---|---|---|
| 5,886,701 A | 3/1999 | Chauvin et al. | |
| 6,104,407 A | 8/2000 | Aleksic et al. | |
| 6,567,099 B1 * | 5/2003 | Dawson | G06T 1/60 345/421 |
| 7,372,471 B1 * | 5/2008 | Hutchins | G06T 11/40 345/422 |
| 7,466,316 B1 * | 12/2008 | Alben | G06F 9/5044 345/501 |
| 2005/0179698 A1 * | 8/2005 | Vijayakumar | G06T 3/4023 345/611 |
| 2009/0179912 A1 * | 7/2009 | Hashizume | G01C 21/367 345/611 |
| 2013/0125107 A1 * | 5/2013 | Bandakka | G06F 8/665 717/171 |
| 2014/0176549 A1 * | 6/2014 | Uralsky | G06T 15/005 345/426 |

FOREIGN PATENT DOCUMENTS

| AU | 2009222438 A1 | 4/2011 |
|---|---|---|
| EP | 2026283 A2 | 2/2009 |

OTHER PUBLICATIONS

Aila, T., et al., "Delay Streams for Graphics Hardware," ACM Transactions on Graphics, vol. 22, 3, pp. 792-800, 2003.

Carpenter, L., "The A-buffer, an antialiased Hidden Surface Method," in Computer Graphics (Proceedings of SIGGRAPH 84), ACM, vol. 18, pp. 103-108, 1984.

(Continued)

*Primary Examiner* — Charles Tseng
(74) *Attorney, Agent, or Firm* — Trop Pruner & Hu, P.C.

(57) ABSTRACT

Visibility may be analytically resolved rather than using point-sampling, thereby entirely avoiding geometric aliasing and the need to store multiple samples per pixel. By relying on existing techniques for shading, i.e., by shading once per fragment and focusing on visibility, visual results may be equivalent to multi-sampled anti-aliasing (MSAA) using an infinite sampling rate in some embodiments.

31 Claims, 5 Drawing Sheets

(56) References Cited

OTHER PUBLICATIONS

Crow, F. C., The Aliasing Problem in Computer-Generated Shaded Images, Communications of the ACM, vol. 20, 11, pp. 799-805, 1977.

Sander, P.V., et al., Discontinuity Edge Overdraw, In Symposium on Interactive 3D Graphics, pp. 167-174, 2001.

Schilling, A., et al., "Exact: Algorithm and Hardware Architecture for an Improved A-buffer," In proceedings of SIGGRAPH 1993, pp. 85-91, 1993.

Schneider, B.-O., et al., "PROOF: An Architecture for Rendering in Object Space," In Advances in Computer Graphics Hardware III (Eurographics '88 Workshop) pp. 121-140, 1991.

EP office action in corresponding EP application No. 14182802.0 dated Jul. 20, 2016 (8 pages).

EP office action in corresponding EP application No. 14182802.0 dated Jun. 1, 2015 (10 pages).

Thomas Auzinger et al., "Non-Sampled Anti-Aliasing", Sep. 13, 2013, pp. 1-8, XP055286041.

Matt Pharr (Editor), "Chapter 30 GeForce 6 Series GPU Architecture," GPU Gems 2: Programming Techniques for High-Performance Graphics and General Purpose Computation, Jan. 1, 2005, Addison-Wesley, pp. 471-491.

Matt Pharr (Editor), "Chapter 42 Conservative Rasterization," GPU Gems 2: Programming Techniques for High-Performance Graphics and General Purpose Computation, Jan. 1, 2005, Addison-Wesley, pp. 677-690.

Marilena Maule et al., "Transparency and Anti-Aliasing Techniques for Real-Time Rendering," Graphics, Patterns and Images Tutorials (SIBGRAPI-T), 2012 25th SIBGRAPI Conference on, IEEE, Aug. 22, 2012, pp. 50-59.

Barringer et al., "A4: Asynchronous Adaptive Anti-Aliasing Using Shared Memory," ACM Transactions on Graphics, ACM USA, vol. 32, No. 4, 100, Jul. 2013, pp. 1-9.

* cited by examiner

ANTI-ALIASING FOR GRAPHICS HARDWARE

BACKGROUND

This relates generally to graphics processing and particularly to anti-aliasing.

Geometric aliasing is a major problem in three dimensional (3D) graphics. Non-axis aligned triangle edges cause ugly staircase artifacts, and fine geometrical detail gives rise to flickering and aliasing as primitives may fall in between samples. This is fundamentally a signal processing problem as the rasterizer point samples the image signal, which has infinite frequency content due to sharp discontinuities.

Current solutions either perform post-processing to attempt to remove the aliasing artifacts, or use multiple samples per pixel to reduce aliasing (e.g., multi-sampled anti-aliasing (MSAA)). Post-processing is fundamentally limited by the initial sampling, while using multiple samples is expensive in terms of bandwidth and power as multiple samples per pixel are stored for the entire screen. Color and depth buffer compression aim to reduce the bandwidth, but the required bandwidth is still large compared to non-multisampled rendering. In regions of high complexity, compression often breaks down.

Aliasing primarily occurs at geometrical discontinuities, i.e., the silhouette edges of an object or interior silhouette edges at creases in a surface, at shading discontinuities, or due to primitives falling between sample points. However, MSAA performs anti-aliasing of all triangle edges and stores multiple samples (color and depth) for all pixels, even in the interior of triangles. This results in an unnecessarily high bandwidth and often redundant shading along shared edges. At high sampling rates, the bandwidth and memory become prohibitive. MSAA does not fully address the problem of small primitives that may still fall in between the sample points.

BRIEF DESCRIPTION OF THE DRAWINGS

Some embodiments are described with respect to the following figures.

DETAILED DESCRIPTION

To address these problems, an anti-aliasing method renders the majority of the screen at only one sample/pixel (spp), while using conservative rasterization to identify and shade pixels that require accurate anti-aliasing. One embodiment handles anti-aliasing of both triangle edges and intersections of triangles. Other embodiments handle anti-aliasing of only silhouette edges and intersections, or silhouettes only. The resulting quality may be nearly identical to a very high or even infinite MSAA rate, while the memory bandwidth is in most cases only marginally higher than rendering at one spp.

The lack of visibly distracting aliasing is one of the key visual differences between offline productions and real-time graphics. One target of anti-aliasing is modern game workloads, which consist of complex scenes with a mix of different triangle sizes. An upper bound may be found for the resources (e.g., compute power and memory bandwidth) needed for perfect geometric antialiasing, against which current and future approximate antialiasing schemes can be compared.

One may analytically resolve visibility rather than using point-sampling, thereby entirely avoiding geometric aliasing and the need to store multiple samples per pixel. One embodiment focuses on visibility, and relies on existing techniques for shading, i.e., by shading once per fragment. In practice, this means visual results may be equivalent to multi-sampled anti-aliasing (MSAA) using an infinite sampling rate.

To reach this goal, two potential modifications to the current graphics hardware pipeline may be used: 1) performing conservative rasterization to find all pixels that conservatively overlap a triangle, and 2) the addition of a fixed-function fragment compositing unit, which can analytically resolve visibility between multiple fragments. Given these two features, analytical anti-aliasing becomes feasible on modern workloads at a moderate bandwidth usage. The method can also be implemented using current graphics application program interfaces (APIs).

Figure 7:
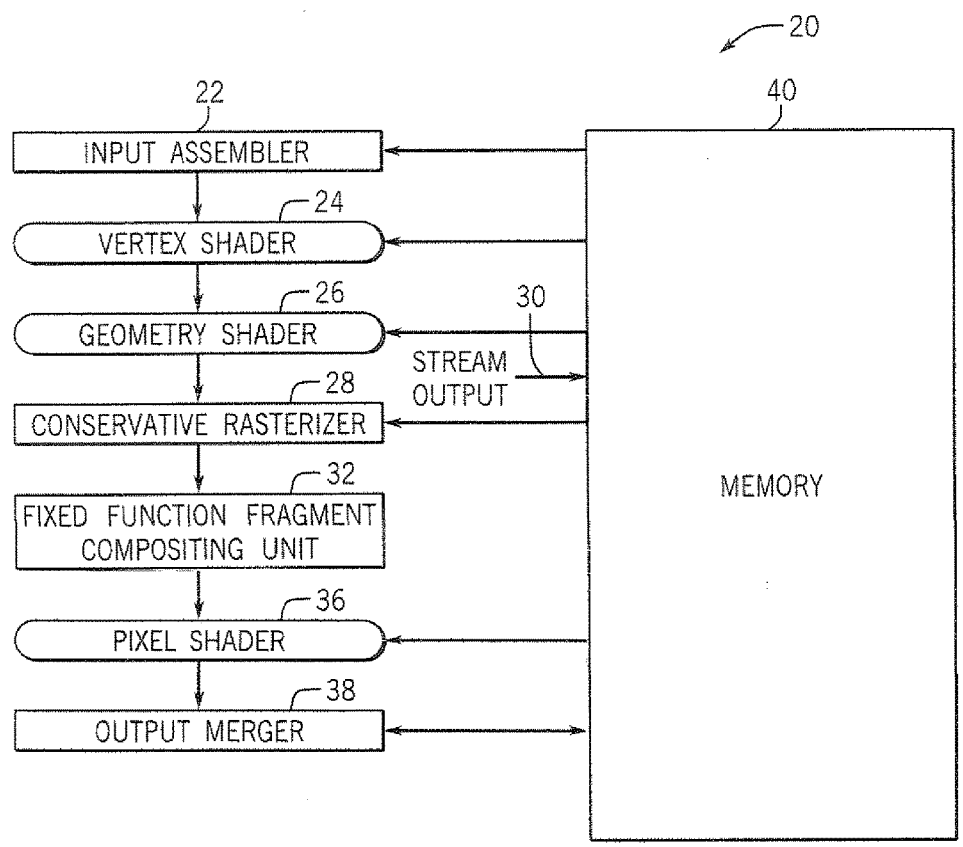
FIG. 7 is a depiction of a graphics pipeline according to one embodiment.

Referring to FIG. 7, one embodiment of a graphics pipeline 20 is depicted. The pipeline may begin with an input assembler stage 22. The input assembler stage supplies data, such as triangles, to the pipeline. The vertex shader stage 24 processes vertices. The geometry shader 26 processes primitives such as triangles. A conservative rasterizer 28 determines which pixel primitives overlap, clips primitives, prepares primitives for the pixel shader, and determines how to invoke the pixel shader stage 36. The fixed function fragment compositing unit 32 is explained further hereinafter. The output merger stage 38 combines various types of output data, such as pixel shader values, depth, and sensor information with the contents of a render target and depth/stencil buffers to generate the final pipeline result. The rasterizer 28 uses a memory 30 for storing render bits.

Quickly growing computational power and slowly growing off-chip bandwidth increases the need for better anti-aliasing. In an era where fixed-function hardware is inexpensive and power-efficient, while bandwidth is expensive, methods for analytical anti-aliasing may improve image quality.

Figure 1:
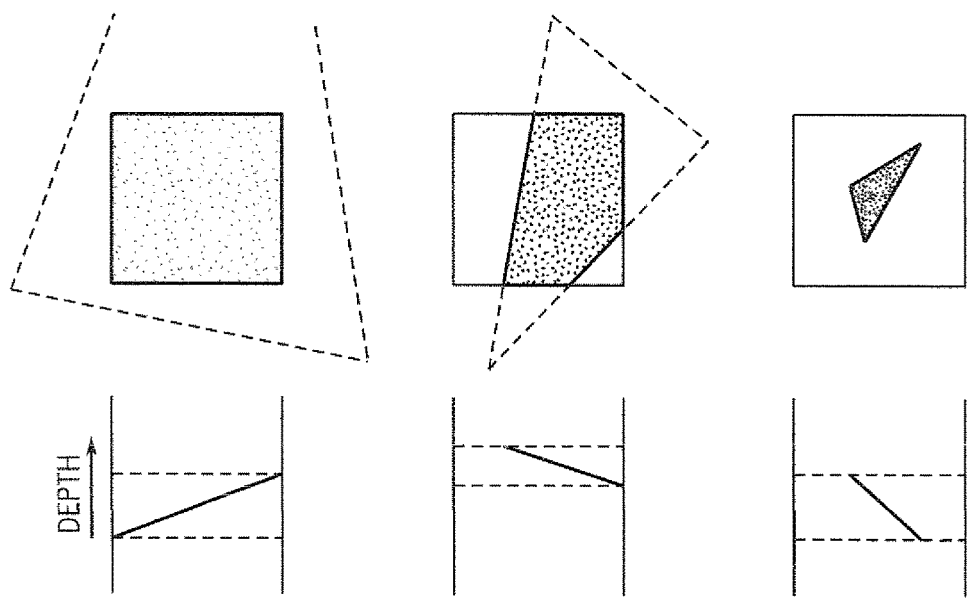
FIG. 1 is a depiction of example fragments that overlap a pixel.

A fragment is the part of a triangle that overlaps a pixel. FIG. 1 shows some examples of fragments (indicated by shading). For each fragment, also indicated by shading, a conservative depth range can be determined, denoted $[z_{min}, z_{max}]$. The fragment to the left fully covers the pixel, while the two fragments on the right are partially covering the respective pixels. The bottom row illustrates the fragments' extents in depth. For each fragment, a conservative depth range, $[z_{min}, z_{max}]$, can be computed (illustrated as dashed lines).

A graphics hardware architecture may be capable of conservative triangle rasterization. With conservative rasterization enabled, all pixels that fully or partially overlap the triangle are marked as covered. This is commonly called outer conservative rasterization. It is also possible to perform inner conservative rasterization, where only fully covered pixels are marked as covered. In both modes, the pixel is shaded at the pixel center or at an appropriately chosen centroid location. If the shading point lies outside the triangle, the vertex attributes may be extrapolated in the same way as normal MSAA operates.

To find all fragments touched by a triangle, a conservative rasterization may be performed instead of standard sample-tested rasterization. Conservative rasterization marks all pixels as covered that are, in any part, overlapping the triangle. Using conservative rasterization, it is also easy to detect if a pixel is fully covered by the triangle by performing an inner conservative test.

The visibility computations may be deferred for all possibly intersecting and/or partially covered fragments, and compositing them analytically after rasterization of the frame (or tile in a tiled renderer). To minimize bandwidth, the number of fragments that need to be stored to memory may be kept at a minimum using a conservative z-prepass in some embodiments. Fragments that are fully covered by a single triangle and do not overlap in depth with other fragments do not need to be analytically resolved.

The goal of one embodiment described below is to perform high-quality antialiasing of all visible triangle edges, as well as all visible intersections of interpenetrating triangles, giving results equivalent to very high or infinite MSAA rates.

During rendering, each triangle edge that requires high-quality anti-aliasing is marked as a discontinuity edge. Several different methods for this are known to those skilled in the art. One may, for example, use mesh adjacency information to detect silhouette edges. This can be implemented in the geometry shader (GS) using current graphics APIs. Discontinuities may also be marked by duplicating shared vertices to break up the mesh connectivity where, for example, shading or texture discontinuities exist. A conservative estimate is to always mark all edges as discontinuity edges, even though this generates more anti-aliasing work.

All rendering passes below run at one sample/pixel. Shading is done at the pixel center (or an appropriate chosen centroid location), and the depth and color buffers store only a single value per pixel. Instead of using multiple samples per pixel, inner or outer conservative rasterization may be used to identify fragments that are partially or fully covered.

Figure 2:
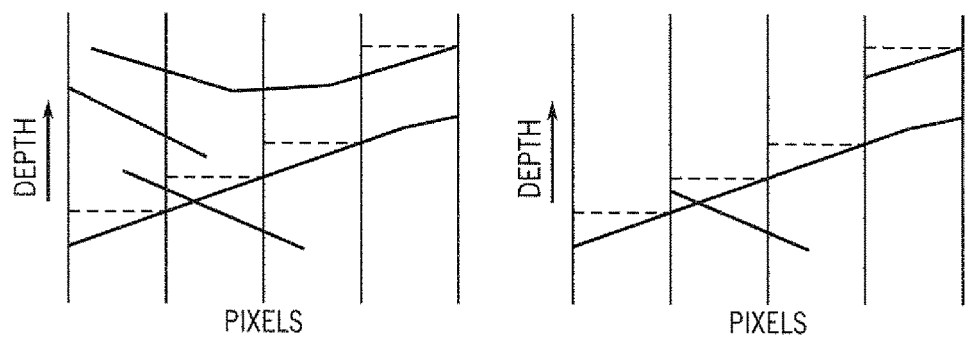
FIG. 2 is a depiction of culling of fragments using a conservative z-prepass according to one embodiment.

For a conservative z-prepass, the scene may be rendered using (inner) conservative rasterization with depth-only output, i.e., only fragments that are fully covered are marked as inside. Then z-buffering (single sample per pixel) may be used to compute the minimum $z_{max}$ for each pixel (empty pixels are at $z_{far}$). Any fragments beyond this depth cannot intersect the frontmost fully covered fragment, so they may be culled in later passes, as illustrated in FIG. 2. By performing a conservative z-prepass, storing the minimum $z_{max}$ of the fully covered fragments, one can effectively cull all fragments with a $z_{min}$ larger than this value, as they are guaranteed not to be visible. The left image shows the cross section of four pixels, with the depth generated by the z-prepass shown as dashed lines. When rendering the scene, only fragments with a conservative minimum depth smaller than this value are output. This can drastically reduce the number of fragments stored, in this case from 4, 5, 4, 3 to 1, 2, 2, 3 for the different pixels, respectively.

In an optional fragment count pass, the scene is rendered using (outer) conservative rasterization. A z-test (less-equal) is enabled, disabling z-write, and outputting $z_{min}$ of each fragment. The number of fragments passing the z-test for each pixel is counted. The algorithm may also keep track of which pixels have fully covered fragments.

Several advantages may result from knowing the per-pixel fragment counts:

1. In the fragment generation pass, there is no need to store complete fragment data for pixels with a single fully covered fragment, just their color (saves bandwidth).

2. One can compute the prefix sum of the fragment counts to preallocate storage for the generated fragments, i.e., the starting index of a fragment array for each pixel. This avoids the need to use an append buffer or global atomics to build linked-lists, and saves four bytes per fragment (next-pointer).

3. The total number of generated fragments is known (last element of the prefix sum), and hence the amount of memory needed. Hence, the driver may reserve the necessary memory pages, and no fall-back mechanism for buffer overflow is needed. The driver may also subdivide the task to cap the memory use, either by tiling or splitting into multiple passes.

The drawback of a fragment count pass is another geometry pass, which is not strictly necessary. In practice, it may be more efficient to skip this pass.

A fragment generation pass is done as follows. Render the scene using (outer) conservative rasterization and shading enabled. Enable z-test (less-equal), but disable z-write, and output $z_{min}$ of each fragment.

For all fragments that pass the depth test, the following sequence is implemented in one embodiment. If the fragment count for the pixel is larger than one, or if the fragment is partially covered, the fragment is passed to the fragment buffer. Otherwise, the color (shaded at pixel center) is written, as in this case, the pixel is fully covered by a single fragment and no intersections occur. Alternatively, if fragment counts were not computed, all fragments that pass the depth test are stored to the fragment buffer.

The stored fragments may contain all information needed to correctly resolve visibility at a later time. There are two main choices: 1) lightweight fragments with just color and a pointer to per-triangle data, or 2) self-contained fragments. The first uses all shaded vertex positions, so they must be streamed out from the vertex shader. The second uses more memory per fragment, but does not include an extra level of indirection and does not require streaming out vertex positions, so may consume less bandwidth overall and has more coherent memory accesses. Alternative (2) is likely to be more efficient, but both alternatives may be used.

Examples of data stored in a self-contained fragment include:

1. Color—single color per fragment (following the MSAA paradigm).

2. Depth gradients—Possibly approximated if they can be made consistent.

3. Analytical coverage—e.g. edge equations. These can be severely approximated (using consistent rules to avoid cracks), e.g., 4 bits subpixel precision gives the equivalent of a 16×16 grid for microrasterization. In some embodiments, the coverage may be resolved already prior to storing the fragment. In this case, a pre-rasterized coverage mask may be stored with the fragment.

4. Full/partial coverage bit—Single bit to identify if fragment fully covers the pixel or not.

The goal, in one embodiment, is that a stored fragment be no larger than a typical buffer entry used for deferred shading in modern games and, ideally, it is in the range of 16-24 bytes or even smaller.

The output from the fragment generation pass is a variably-sized array/list of fragments per pixel. The MSAA resolve operation is replaced by a pass that analytically or semi-analytically resolves visibility, using full analytical compositing, microrasterization, or precomputed rasterization, as described below. This is done by sending all fragments for a pixel to a fragment compositing unit (FCU). The FCU is initialized to the clear color, and outputs a final pixel color based on the fractional visibility of the different fragments. Internally, the FCU builds an appropriate data structure to perform this operation as efficiently as possible.

The FCU can be implemented entirely in software, in fixed-function hardware, or as a combination of software and fixed-function hardware. Its operations may be controlled by the graphics driver, application code, firmware, or other hardware units.

There are different implementation strategies for the FCU:

1. Fully analytical—Build a binary space partitioning (BSP)-tree for the pixel. This can be optimized for the typical case of just one or a few fragments per pixel. For longer fragment lists we may fall-back on microrasterization to keep the local scratch memory bounded.

2. Microrasterization—Rasterize fragments to a fixed small grid (say 16×16). Unlike a traditional MSAA, this rasterization may be done locally for the pixels that need it and entirely on chip. The fixed-function unit can be highly optimized for a single low raster resolution etc.

3. Precomputed rasterization—Each edge equation maps to a precomputed mask, which are AND'ed together to compute the final coverage mask.

The FCU may also implement a combination of several techniques, choosing the most efficient for each list of fragments to be resolved. To help the decision, each fragment may be tagged as fully or partially covered, as identified by the inner conservative test.

The algorithm may completely replace MSAA, performing antialiasing at all edges and triangle intersections. The conservative z-prepass may ensure that only one or a few fragments are stored for most pixels. Alternatively, the method can be modified to only perform analytical antialiasing of visible discontinuity edges (e.g., object edges and silhouettes), where aliasing is most likely to occur. This further reduces the number of fragments that need analytical composition.

Discontinuity edges can be identified using mesh adjacency information. This involves preprocessing of the geometry, and additional code in the geometry shader or per-triangle compute shader. Another option is to use delay streams for silhouette detection. The following discussion assumes that discontinuity edge information is available to the pixel shader.

Fragments along shared triangle edges that are not discontinuity edges can generally be rasterized as usual (i.e., using one sample/pixel at the pixel center), since by definition, they represent surfaces that cover the entire pixel. Potential intersections still have to be resolved using other means. Fragments along visible discontinuity edges may also be output for analytical compositing.

Several special cases arise. A pixel may, for example, contain a mix of fragments from both discontinuity and non-discontinuity edges. Fragments may intersect each other, and even if only fragments from non-discontinuity edges exist (e.g., the fragments along the shared edge of two triangles), these may still intersect the fully covered background fragment. Hence, simple z-buffering at the pixel center is not always enough to resolve visibility robustly. Depending on the use case, there are different alternatives for handling this.

According to a first alternative ("alternative 1"), the goal is to handle all fragment intersections and all discontinuity edges correctly, while rendering fully covered fragments and fragments from shared edges using a single sample per pixel. This can be done by doing the following sequence.

During the conservative z-prepass, the $z_{min}$ of the nearest fragment that fully covers the pixel is additionally stored, where "nearest" is defined as before. This can be implemented by storing $z_{min}$ to a render target or random access buffer using atomic operations. Then, the pixels that need analytical fragment compositing are identified. This may be used if any of the following cases exists in a pixel:

at least one fragment comes from a discontinuity edge, which is not culled by the conservative depth buffer;

at least one fragment (fully or partially covered) exists that overlaps in depth with the nearest fully covered fragment, i.e., that overlaps the $[z_{min}, z_{max}]$ range given by the modified conservative z-prepass; or more than two partially covered fragments lie fully in front of the nearest fully covered fragment, i.e., their maximum depths are all smaller than $z_{min}$ of the pixel.

The last two cases may be analytically resolved, as there is a chance the fragments may intersect each other.

In the fragment generation pass, all non-culled fragments are output for pixels marked as needing analytical compositing to the fragment buffer, as before. For the remaining pixels, one can safely rely on z-buffering (i.e., depth test and writes enabled) at the pixel center to resolve visibility.

In a second alternative ("alternative 2"), assume that no intersecting fragments exist (i.e., no two triangles are interpenetrating), or that one does not care about handling intersections correctly. Intersections of static geometry can be avoided when modeling the geometry or using automatic mesh processing tools, while for dynamic geometry, robust collision handling methods can be used. Under this assumption, the algorithm can be further simplified.

The rules in alternative 1 above are modified so that analytical composition is only needed in case at least one fragment comes from a discontinuity edge, which is not culled by the conservative depth buffer. For these pixels, output all non-culled fragments for analytical compositing. In all other cases, rely on standard z-buffering at the pixel center.

As an extra optimization, one may additionally compute the $z_{min}$ of fully covered fragments and the fragments from non-discontinuity edges, and output only the fragments from discontinuity edges if these lie fully in front of $z_{min}$. If there is an overlap in depth, however, one must output all non-culled fragments as before to correctly resolve visibility.

In a third, most simplified algorithm ("alternative 3"), assume that no fragments intersect or that intersections do not need to be handled (i.e., same as in alternative 2). Additionally, assume that there are no visible fragments from a discontinuity edge that lie behind "regular" fully covered or partially covered fragments from non-discontinuity edges. This assumption can result in visual artifacts at object silhouettes or other discontinuity edges if they lie very close to other geometry. Nevertheless, it may provide a useful tradeoff between performance and antialiasing quality for some use cases.

Under these assumptions, the depth computed at the pixel center can be used for rendering all "regular" fragments (fully covered or fragments from non-discontinuity edges). The conservative z-prepass is modified so that the depth at the pixel center is written (instead of $z_{max}$).

In the fragment generation pass, both z testing and writes are enabled. Fully covered fragments and fragments from non-discontinuity edges that overlap the pixel center, are shaded and the depth buffer updated. Fragments from discontinuity edges that lie closer in depth than the z-buffer value are output to the fragment buffer for later compositing.

Several variants of this algorithm are possible. For example, the generation of fragments for analytical compositing can be separated from the rendering of the "regular" fragments. In this case the initial z-prepass can optionally be removed, as it serves less of a purpose (it only reduces shading cost, not the number of generated fragments). To save further shading, the initial z-prepass may alternatively be modified to output depth for both fully covered fragments and fragments from non-discontinuity edges that overlap the pixel center. In this case, it needs to use outer conservative rasterization.

To implement alternatives 1 and 2 above, the pixel classification may be done in a separate pass, before the fragment generation pass, as the latter needs to know already at start whether all non-culled fragments should be output for a pixel or not. It is safe to overestimate the number of pixels that need analytical compositing, in case the exact rules are difficult/expensive to test.

The classification may done as part of the conservative z-prepass or in a separate rendering pass. This can be implemented either using stencil operations, render target operations, or atomic operations on general memory buffers (e.g., with unordered access views (UAVs) in DirectX 11 (DX11)).

Alternative 3 does not depend on a prior classification of the pixels. However, if fragment output is implemented as a separate pass, it may benefit from a pixel classification to avoid unnecessary work. For example, one may use the stencil buffer to keep track of which pixels have fragments from non-discontinuity edges during the main rendering pass of the "regular" fragments.

Features that can be relatively easily supported include:

Pixel discard—The discards must be done already in the z-prepass so that depth is not updated for discarded fragments.

Output coverage—An N-sample coverage mask may be stored along with the generated fragment and taken into account by the FCU, e.g., each coverage sample may mask off a subpixel region. The output coverage mask must be taken into account in the z-prepass, to avoid depth writes for non-fully covered fragments.

Alpha blending—More fragments need to be stored, i.e., all fragments that are semi-transparent and the opaque ones behind. To support blend state changes, a bit mask may be stored with the fragments to indicate how the fragments should be blended by the FCU.

Order-independent transparency—The FCU can be designed to sort the fragments internally, in which case they can be correctly composited back-to-front or front-to-back. In the z-prepass, we should ignore transparent fragments, so that these fragments are stored by the fragment generation pass. This can be seen as hardware accelerated order-independent transparency (OIT).

Figure 3:
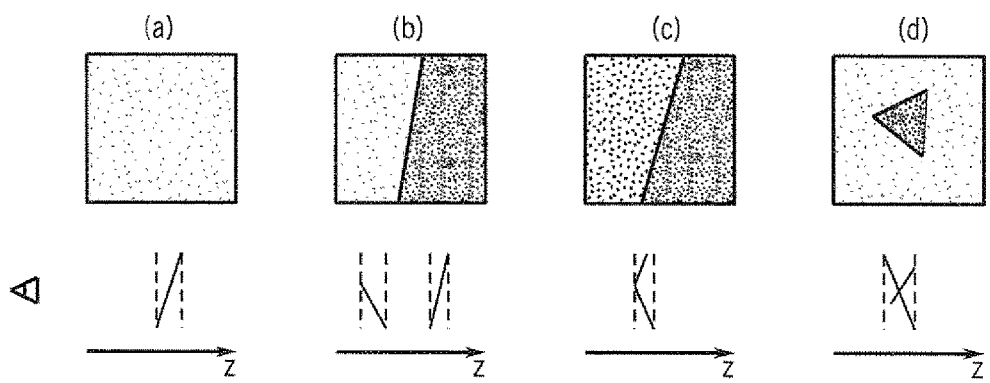
FIG. 3 is a depiction of pixel classification according to one embodiment.

The pixels in a scene can be classified based on the complexity of their fragment geometry. FIG. 3 shows examples of increasing complexity. From left to right, examples of increasing complexity are shown: (a) is trivially handled, (b)-(c) can be easily sorted, and (d) requires clipping before sorting. This is expected to be a rare case, and can thus be handled using a slower fallback mechanism. The pixels' properties are summarized below:

|  | (a) | (b) | (c) | (d) |
|---|---|---|---|---|
| partial coverage | no | yes | yes | yes |
| overlapping in z | no | no | yes | yes |
| intersecting | no | no | no | yes |
| example | interior | object edge | interior edge | intersecting |
| strategy | no sort | trivial sort | can be sorted | needs clipping |
| expected frequency | high | medium | high | very low |

One advantage of sorting the fragments in order to do a simple front-to-back compositing, is that it is easy to extend this to support order-independent transparency.

If a fragment is stored as a depth value and two gradients: $z_i(x,y)=z_i+x\Delta z_{i,x}+y\Delta z_{i,y}$, then the difference between the corresponding values for two fragments describe a plane that indicates which fragment is closer by the sign of its z-value. The intersection between the plane and z=0 gives the line of intersection. This can be directly used as an edge equation for rasterizing the clipped region without actually performing the clipping.

The fragments in a pixel may be sorted into a head list, which contains only the frontmost fragments that overlap in depth, after which there is a gap to the next fragment(s). If the pixel is fully covered after determining visibility of the head list, the remaining fragments can be safely ignored.

An efficient method for finding the head list, which operates in place on a list of fragments is set out below. The input is an array of N fragments, which is rearranged so that the n first items represent the head list (n is returned by HeadSort below):

```
int HeadSort(fragment elem[N])
{
    k = fragment with smallest zmin   // for loop
    swap(elem[0], elem[k])
    zmax = elem[0].zmax
    current = tail = 1
    while (current < N)
    {
        if (elem[current].zmin <= zmax)
        {
            // elem should be part of head list
            swap(elem[tail], elem[current])
            if (elem[tail].zmax > zmax)
            {
                zmax = elem[tail].zmax
                current = tail
            }
            tail++
        }
        current++
    }
    return tail
}
```

The algorithm keeps a tail pointer to the element immediately following the head list, and loops towards the end. When an element is found that overlaps in z with the head list, it is swapped in, but the loop is only restarted if the added elements extends the z-range. The worst case time complexity is $O(N^2)$, but in practice the average is closer to $O(N)$ as N is typically small and few fragments overlap.

If memory is inexpensive, but bandwidth expensive, algorithms that write and read the data only once may be more efficient than methods that repeatedly read/modify/write data to keep a fixed storage per pixel, even if the memory footprint is larger. Many of the methods used today are motivated by a desire to keep a small, fixed memory footprint, but this may change in the future.

All operations can be implemented in current graphics APIs (e.g., Direct X11 (DX11)). One problem is the lack of hardware support for conservative rasterization. This can currently be implemented by growing the primitive in the geometry shader. Alternatively, the rasterization may be done entirely in compute mode, where conservative rasterization can more easily be implemented.

Fragments can be efficiently output to an append buffer using atomic operations, storing per-pixel linked lists of fragments. The resolve pass can then be implemented as compute shader by packing pixels that need work together. The efficiency is limited by the branch divergence of the compositing operations, and the varying number of fragments in nearby pixels. The operations may ideally be broken down into coherent smaller chunks of work, kept in shared local memory to keep utilization high at the expensive of (on chip) memory bandwidth.

Figure 4:
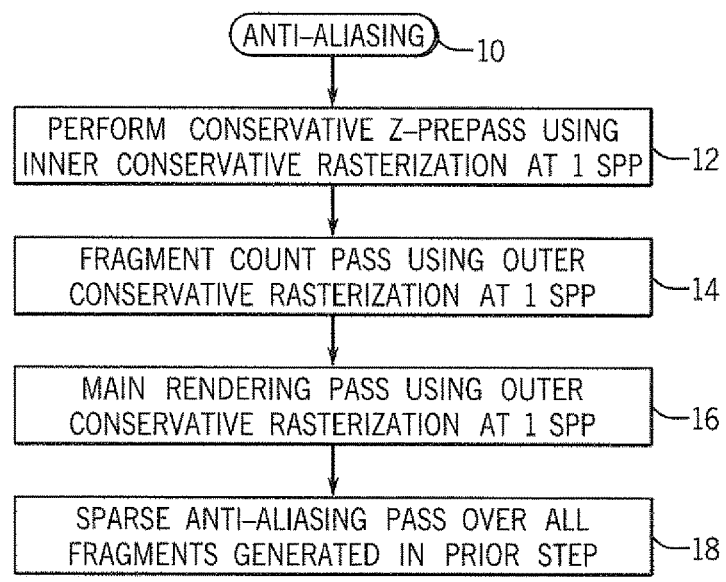
FIG. 4 is a flow chart for one embodiment.

A sequence 10, shown in FIG. 4, may be implemented in software, firmware and/or hardware. In software and firmware embodiments, it may be implemented by computer executed instructions stored in one or more non-transitory computer readable media such as magnetic, optical or semiconductor storage. As one example, the instructions may be stored in memory accessed by a graphics processing unit.

The sequence 10 of FIG. 4 begins with a conservative Z-prepass using inner conservative rasterization at 1 spp (block 12). For each fully covered pixel, the maximum depth (Z-max) over the pixel is written to the depth buffer. The Z-max may be computed by evaluating the triangle's depth at all four corners of the pixel. At the end of this pass, the depth buffer represents a conservative piecewise continuous surface against which it is safe to cull subsequent rendering.

Next, a fragment count pass using outer conservative rasterization at 1 spp may be done in some embodiments (block 14). A depth test is enabled, but not depth writes. For each pixel, the minimum depth (Z-min) is output and for each pixel, the number of fragments that pass the depth test is counted. Pixels that are fully covered by a single triangle, without risk of intersections, get a count of 1. The count is higher for pixels with multiple potentially visible fragments.

In this pass, additional information to guide the antialiasing may be generated in some embodiments.

The main rendering pass (block 16) uses outer conservative rasterization at 1 spp. A depth test is enabled, but not depth writes. For each pixel, the minimum depth (Z-min) is output. Each generated fragment that passes the depth test is shaded at the pixel center or at an appropriately chosen centroid location for partially covered fragments. Then one of the following actions may be taken in some embodiments.

A. If pixel is fully covered and the fragment count is 1 (as given by the fragment count pass), write the color to the frame buffer. For these pixels, no further work is necessary.

B. If pixel is partially covered or the fragment count is larger than 1, it is stored to a separate array along with auxiliary information (discussed below). Each such "pixel" is called a fragment. The fragments may be arranged in per-pixel linked lists, or simply stored linearly together with screen-space (x,y) positions. After being stored, the pixel is discarded for further processing in the normal 3D pipeline (i.e., it does not result in any frame buffer updates).

Then a sparse anti-aliasing pass (block 18) may be done over all fragments generated in the main rendering pass of block 16. For each pixel the list of associated fragments is processed to resolve visibility and color. The color of each fragment was computed already in the main rendering pass, so the partial visibility may be computed and the colors blended together accordingly. One of the following methods may be used in some embodiments.

A. The fragments may include, as auxiliary information, the triangle's edge equations. Based on these, a local rasterization can be done to compute accurate coverage information within the pixel. For this purpose, the edge equations may be heavily quantized to save space. Since this step operates on chip, locally within a pixel, and only on a sparse set of pixels, one can afford to do this step at a high resolution (e.g., 16×16 samples) for very accurate antialiasing.

B. The coverage information may also be analytically computed based on the edge equations by building a binary space partitioning (BSP)-tree, and weighting each color by the final analytically computed coverage.

C. A combination of A and B where "simple" cases are handled using analytically computed coverage, for example, the case of only up to N fragments (e.g., 2), and the rest using rasterized coverage.

D. The fragments just store a primitive identifier and/or vertex identifier, which allows the original vertex data to be accessed in order to resolve coverage using methods A, B, or C. The shaded vertex positions may be stored during rendering, or recomputed in this pass.

Extended methods may be used to only handle discontinuity edges (and intersections) in some embodiments. Since shading often changes smoothly in the interior of objects, the above algorithm can be extended to only handle the most important cases (discontinuity edges and intersections). This reduces the number of generated fragments and potentially saves power and bandwidth.

One extension may use a conservative Z-prepass, as in the basic algorithm, while storing both the minimum (Z-min) and maximum (Z-max) depth of the nearest fully covered fragment.

In another extension, the fragment count pass operates as in the basic algorithm, but the pixels that need antialiasing are classified based on the following rules. Based on the fragments that pass the depth test, if any of the following cases occurs, mark the pixel for antialiasing:

A. At least one fragment comes from a discontinuity edge.

B. At least one fragment overlaps in depth with the nearest fully covered fragment (i.e., overlaps the Z-min, Z-max range computed in block 12).

C. At least three partially covered fragments lie in front of the nearest fully covered fragment, i.e., they have a maximum depth smaller than Z-min.

Case A ensures that all visible discontinuity edges are correctly antialiased. Case B and C ensure that intersecting fragments are correctly antialiased. The motivation for case C is that, if only two partially covered (non-discontinuity edge) fragments lie in front, they must by definition fully cover the pixel and there is no risk of intersections. However, if three or more such fragments exist, they may potentially come from different surfaces that intersect each other.

As an optimization, if one assumes that no intersections occur or that intersections do not need to be handled only case A is needed. In this case, the Z-min is not needed and block 12 can be left unmodified.

In another extension, the main rendering pass is done as before, but both depth test and depth writes are enabled. Each generated fragment that passes the depth test is shaded, as before. Then one of the following actions is taken:

A. If pixel is marked for antialiasing in block 16, the fragment is shaded and output together with its auxiliary information is stored to the separate fragment buffer, as before. In this case no frame buffer (color/depth) updates are done.

B. If pixel is not marked for antialiasing and the fragment overlaps the pixel center, the fragment is shaded and the frame buffer is updated with its color and depth (computed at pixel center).

C. If pixel is not marked for antialiasing and the fragment does not overlap the pixel center, it is discarded and no frame buffer updates are done for this fragment.

Case A is responsible for generating all fragments that need to be processed for anti-aliasing in the next pass (sparse anti-aliasing) described below. Case B and C correspond to standard z-buffer rendering of the remaining fragments using 1 spp. This avoids redundant shading at shared edges.

Sparse anti-aliasing passes may be done with no changes as compared to basic algorithm. Fewer fragments need to be processed than before, as only pixels that were marked for antialiasing will have non-empty lists of fragments.

Figure 5:
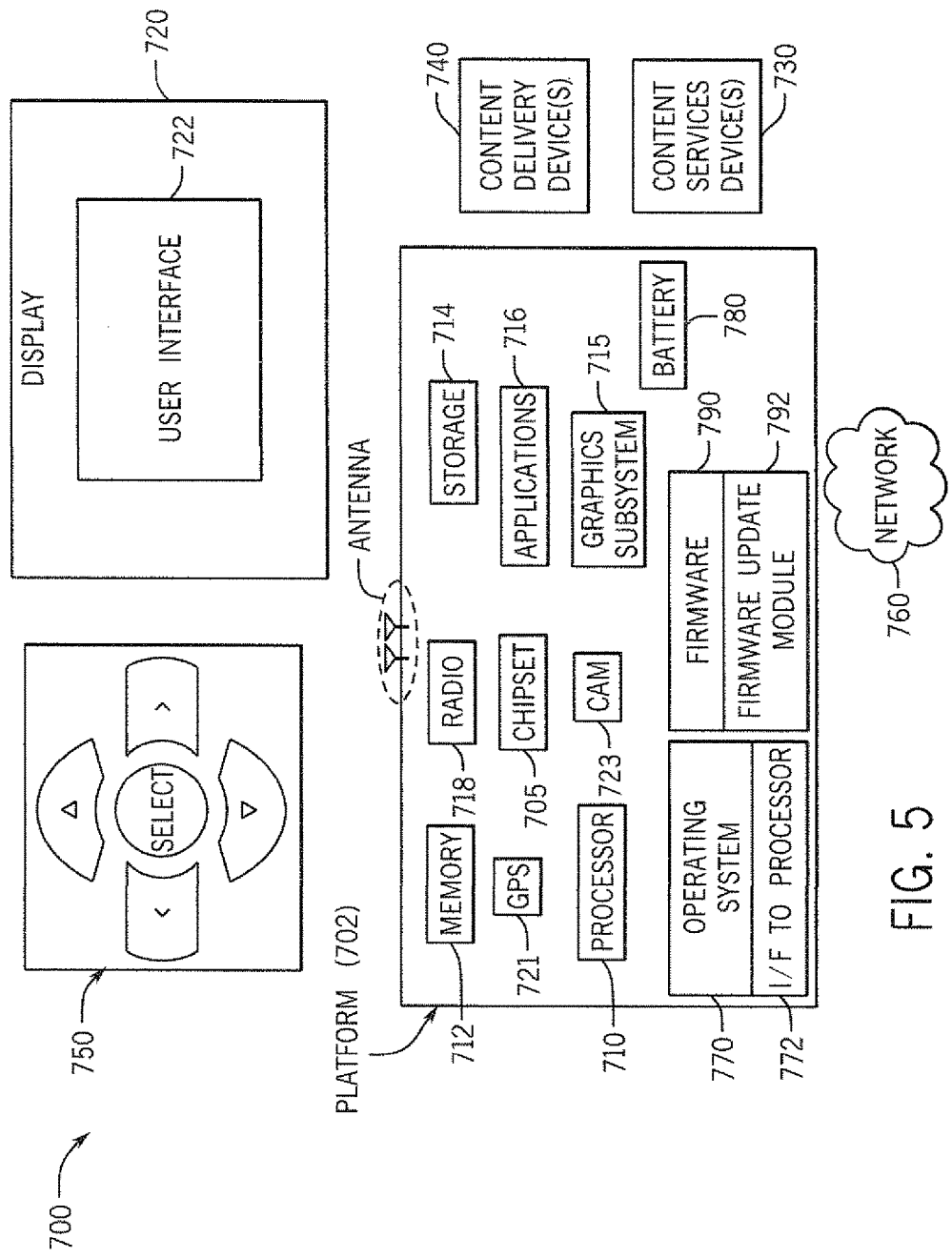
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 4 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
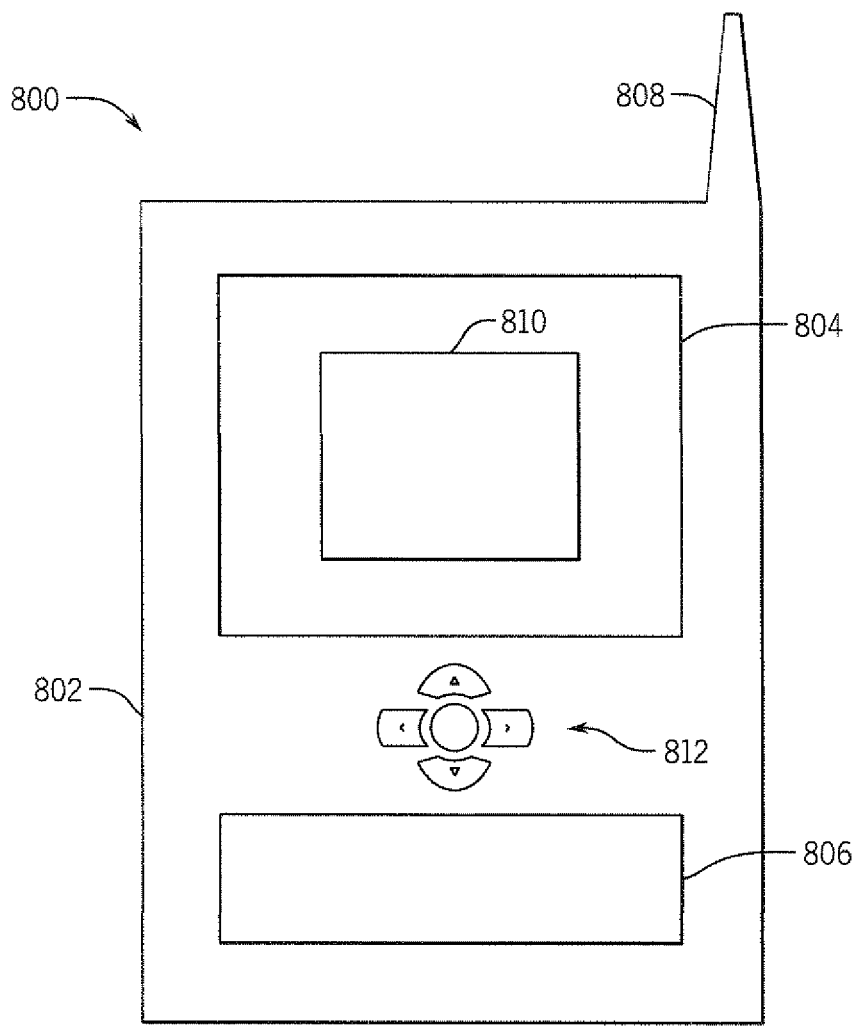
FIG. 6 is a front elevational view of one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 4 in software and/or firmware embodiments.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising finding all pixels that in any part overlap a triangle, passing fragments to a buffer, and resolving visibility between multiple fragments. The method may also include performing outer conservative rasterization. The method may also include performing inner conservative rasterization. The method may also include running all rendering passes at one sample per pixel. The method may also include resolving visibility by performing micro-rasterization. The method may also include analytically resolving visibility between multiple fragments. The method may also include performing anti-aliasing at all edges and triangle intersections. The method may also include performing anti-aliasing only at visible discontinuity edges. The method may also include determining per pixel fragment counts. The method may also include for all fragments passing a depth test, passing a fragment to a buffer if the fragment count for a pixel is larger than one or if the fragment is partially covered.

Another example embodiment may be at least one non-transitory computer readable medium storing instructions executed by a processor to perform a sequence comprising finding pixels that in any part overlap a triangle, passing fragments to a buffer, and resolving visibility between multiple fragments. The medium may include said sequence including performing outer conservative rasterization. The medium may include said sequence including performing inner conservative rasterization. The medium may include said sequence including running all rendering passes at one sample per pixel. The medium may include said sequence including resolving visibility by performing micro-rasterization. The medium may include said sequence including analytically resolving visibility between multiple fragments. The medium may include said sequence including performing anti-aliasing at all edges and triangle intersections. The medium may include said sequence including performing anti-aliasing only at visible discontinuity edges. The medium may include said sequence including determining per pixel fragment counts. The medium may include said sequence including, for fragments passing a depth test, passing a fragment to a buffer if the fragment count for a pixel is larger than one or if the fragment is partially covered.

In another example embodiment may be an apparatus comprising a processor to find pixels that in any part overlap a triangle, pass fragments to a buffer, and resolve visibility between multiple fragments, and a storage coupled to said processor. The apparatus may include said processor to perform outer conservative rasterization. The apparatus may include said processor to perform inner conservative rasterization. The apparatus may include said processor to run all rendering passes at one sample per pixel. The apparatus may include said processor to resolve visibility by performing micro-rasterization. The apparatus may include said processor to analytically resolve visibility between multiple fragments. The apparatus may include said processor to perform anti-aliasing at all edges and triangle intersections. The apparatus may include an operating system, a battery, firmware and a module to update said firmware.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   marking pixels for anti-aliasing if:
   at least one fragment comes from a discontinuity edge; or
   at least one fragment overlaps in depth with a nearest fully covered fragment; or
   at least three partially covered fragments lie in front of the nearest fully covered fragment;

shading marked pixels and updating a fragment buffer; and for each unmarked pixel:
 shading a fragment for that unmarked pixel if the fragment overlaps a pixel center and updating a frame buffer; and
 if the fragment does not overlap the pixel center, discarding that unmarked pixel.

2. The method of claim 1 including:
finding pixels that in any part overlap a triangle;
resolving visibility between multiple fragments; and
performing anti-aliasing only at visible depicted object discontinuity edges and silhouettes.

3. The method of claim 1 including performing outer conservative rasterization.

4. The method of claim 3 including analytically resolving visibility between the multiple fragments.

5. The method of claim 1 including running all rendering passes at one sample per pixel.

6. The method of claim 1 including resolving visibility by performing micro-rasterization.

7. The method of claim 1 including performing anti-aliasing at all edges and triangle intersections.

8. The method of claim 1 including determining per pixel fragment counts.

9. The method of claim 8 including, for all fragments passing a depth test, passing the fragments passing the depth test to the fragment buffer if a fragment count for a pixel is larger than one or if the fragments passing the depth test are partially covered.

10. The method of claim 1 including rendering a screen at one sample per pixel except at the visible depicted object discontinuity edges.

11. At least one non-transitory computer readable medium storing instructions executed by a processor to perform a sequence comprising:
marking pixels for anti-aliasing if:
 at least one fragment comes from a discontinuity edge; or
 at least one fragment overlaps in depth with a nearest fully covered fragment; or
 at least three partially covered fragments lie in front of the nearest fully covered fragment;
shading marked pixels and updating a fragment buffer; and
for each unmarked pixel:
 shading a fragment for that unmarked pixel if the fragment overlaps a pixel center and updating a frame buffer; and
 if the fragment does not overlap the pixel center, discarding that unmarked pixel.

12. The non-transitory computer readable medium of claim 11 sequence including
finding pixels that in any part overlap a triangle;
resolving visibility between multiple fragments; and
performing anti-aliasing only at visible depicted object discontinuity edges and silhouettes.

13. The non-transitory computer readable medium of claim 12, said sequence including performing outer conservative rasterization.

14. The non-transitory computer readable medium of claim 13, said sequence including analytically resolving visibility between the multiple fragments.

15. The non-transitory computer readable medium of claim 12, said sequence including running all rendering passes at one sample per pixel.

16. The non-transitory computer readable medium of claim 12, said sequence including resolving visibility by performing micro-rasterization.

17. The non-transitory computer readable medium of claim 12, said sequence including performing anti-aliasing at all edges and triangle intersections.

18. The non-transitory computer readable medium of claim 12, said sequence including determining per pixel fragment counts.

19. The non-transitory computer readable medium of claim 18, said sequence including, for fragments passing a depth test, passing a the fragments passing the depth test to the fragment buffer if a fragment count for a pixel is larger than one or if the fragments passing the depth test are partially covered.

20. The non-transitory computer readable medium of claim 12, said sequence including rendering a screen at one sample per pixel except at the visible depicted object discontinuity edges.

21. An apparatus comprising:
a processor configured to:
 mark pixels for anti-aliasing if:
  at least one fragment comes from a discontinuity edge; or
  at least one fragment overlaps in depth with a nearest fully covered fragment; or
  at least three partially covered fragments lie in front of the nearest fully covered fragment;
 shade marked pixels and update a fragment buffer;
 for each unmarked pixel:
  shade a fragment for that unmarked pixel if the fragment overlaps a pixel center and update a frame buffer; and
  if the fragment does not overlap the pixel center, discard that unmarked pixel:
and a memory coupled to said processor.

22. The apparatus of claim 21 said processor to find pixels that in any part overlap a triangle, resolve visibility between multiple fragments, and perform anti-aliasing only at visible depicted object discontinuity edges and silhouettes.

23. The apparatus of claim 22, said processor to perform outer conservative rasterization.

24. The apparatus of claim 23, said processor to analytically resolve visibility between the multiple fragments.

25. The apparatus of claim 22, said processor to run all rendering passes at one sample per pixel.

26. The apparatus of claim 22, said processor to resolve visibility by performing micro-rasterization.

27. The apparatus of claim 22, said processor to perform anti-aliasing at all edges and triangle intersections.

28. The apparatus of claim 22 including an operating system.

29. The apparatus of claim 22 including a battery.

30. The apparatus of claim 22 including firmware and a module to update said firmware.

31. The apparatus of claim 22, said processor to render a screen at one sample per pixel except at the visible depicted object discontinuity edges.

* * * * *